US007547123B2

(12) United States Patent
Kittredge et al.

(10) Patent No.: US 7,547,123 B2
(45) Date of Patent: Jun. 16, 2009

(54) HIGH EFFICIENCY, COMPACT, MODULAR FORCED AIR COOLING SYSTEM FOR HIGH INTENSITY LED LIGHT SOURCE

(75) Inventors: Ryan A. Kittredge, Ira, VT (US); Scott P. Sabatino, West Rutland, VT (US); Thomas F. Schnabel, Rochester, VT (US); John E. Thrailkill, Shelburne, VT (US)

(73) Assignee: Advanced Illumination, Inc., Rochester, VT (US)

( * ) Notice: Subject to any disclaimer, the term of this patent is extended or adjusted under 35 U.S.C. 154(b) by 0 days.

(21) Appl. No.: 11/523,243

(22) Filed: Sep. 19, 2006

(65) Prior Publication Data

US 2007/0070630 A1 Mar. 29, 2007

Related U.S. Application Data

(60) Provisional application No. 60/720,406, filed on Sep. 26, 2005.

(51) Int. Cl.
*B60Q 1/06* (2006.01)

(52) U.S. Cl. ....................... 362/373; 362/294; 362/800; 362/218; 362/219; 362/249; 362/252

(58) Field of Classification Search ................. 362/373, 362/294, 800, 218, 219, 249, 252
See application file for complete search history.

(56) References Cited

U.S. PATENT DOCUMENTS

| | | | | |
|---|---|---|---|---|
| 7,021,799 | B2 * | 4/2006 | Mizuyoshi | 362/294 |
| 7,267,461 | B2 * | 9/2007 | Kan et al. | 362/373 |
| 2005/0201097 | A1 * | 9/2005 | Kiraly et al. | 362/294 |
| 2005/0201098 | A1 * | 9/2005 | DiPenti et al. | 362/294 |

* cited by examiner

*Primary Examiner*—Sandra L O'Shea
*Assistant Examiner*—Jessica L McMillan
(74) *Attorney, Agent, or Firm*—Cesari and McKenna, LLP

(57) ABSTRACT

A forced air cooling unit for a light source formed of an array of high intensity light emitting diodes (LEDs). A housing includes side walls with a pair of grooves on the inside of the walls. A heat sink includes side extensions which are slidably received in the grooves. The LED array is mounted in thermal contact with the heat sink so as to protrude from the top of the housing. The housing side walls include a second pair of inside grooves below the first pair. The second pair of grooves slidably receive a cooling fan base plate. An internal air flow chamber thus defined by the housing side walls, the base plate and the heat sink. A cooling fan, mounted at one end of the base plate, draws cooling air into internal chamber. The air flows by the heat sink, carrying with it heat generated by the LEDs, to the other opposite end of the base plate, where it exits the internal chamber through openings in the base plate. The cooling units are self-contained and modular and can be mounted side-by-side or end-to-end to accommodate a variety of LED array sizes and configurations.

15 Claims, 5 Drawing Sheets

HIGH EFFICIENCY, COMPACT, MODULAR FORCED AIR COOLING SYSTEM FOR HIGH INTENSITY LED LIGHT SOURCE

CROSS-REFERENCE TO RELATED APPLICATIONS

The present application claims the benefit of U.S. Provisional Patent Application Ser. No. 60/720,406, which was filed on Sep. 26, 2005, by Kittredge et al. for a HIGH EFFICIENCY, COMPACT, MODULAR FORCED AIR COOLING SYSTEM FOR HIGH INTENSITY LED LIGHT SOURCE and is hereby incorporated by reference.

FIELD OF THE INVENTION

This invention relates to cooling systems for light emitting diode light sources. It relates more particularly to a high efficiency, modular air cooling system for such light sources.

BACKGROUND INFORMATION

High intensity light emitting diode ("LED") light sources are used in a variety of applications, including notably, machine vision and related applications. High intensity LEDs are preferred for use in modem day machine vision systems because of their high illumination intensities (e.g., in the range of about 1 to 5 watts per LED), superior radiation characteristics and longer operating lives compared to conventional, low intensity (e.g., 20 to 60 milliwatt) LEDs. However, high intensity LEDs draw substantially higher operating currents, and thus generate substantially more heat during operation, than conventional low intensity LEDs. Consequently, arrangements must be made to conduct heat generated by high intensity LEDs away from the LEDs during operation and to otherwise cool light sources incorporating them. Cooling becomes particularly important in light sources comprised of an array of many, closely spaced, high intensity LEDs due to the cumulative effect of their individual heating.

SUMMARY OF THE INVENTION

The present invention aims to provide an improved high intensity LED-based light source and cooling system therefore.

Another object of the invention is to provide a modular, forced air cooling system for high-intensity LED-based light sources that allows individual cooling units to be added to the light source as dictated by the size and configuration of the LED array, i.e., the number and geometrical arrangement of LEDs, in the light source.

Another object of the invention is to provide a cooling system for high-intensity LED-based light sources of the type described in which the individual cooling units are compact, individually air-cooled and stackable depending on the size and configuration of the LED array in the light source.

Yet another object of the invention is to provide a cooling system for high intensity LED-based light sources of the type described in which each of the individual cooling units includes a heat sink chamber that is thermally isolated from the chambers of adjacent units and in which air flow is optimized through the individual heat sink chamber to prevent thermal short-circuiting between units.

A further object of the invention is to provide a cooling system for high intensity LED-based light sources of the type described in which the individual cooling units have a relatively simple design, are relatively easy and inexpensive to manufacture and are relatively easy to mount in a housing for the light source.

Other objects will, in part, be obvious and will, in part, appear hereinafter. The invention accordingly comprises the features of construction, combination of elements and arrangements of parts which will be exemplified in the following detailed description.

BRIEF DESCRIPTION OF THE DRAWINGS

For a fuller understanding of the nature and objects of the invention, reference should be made to the following detailed description taken in conjunction with the accompanying drawings, in which.

DETAILED DESCRIPTION OF AN ILLUSTRATIVE EMBODIMENT

Figure 1:
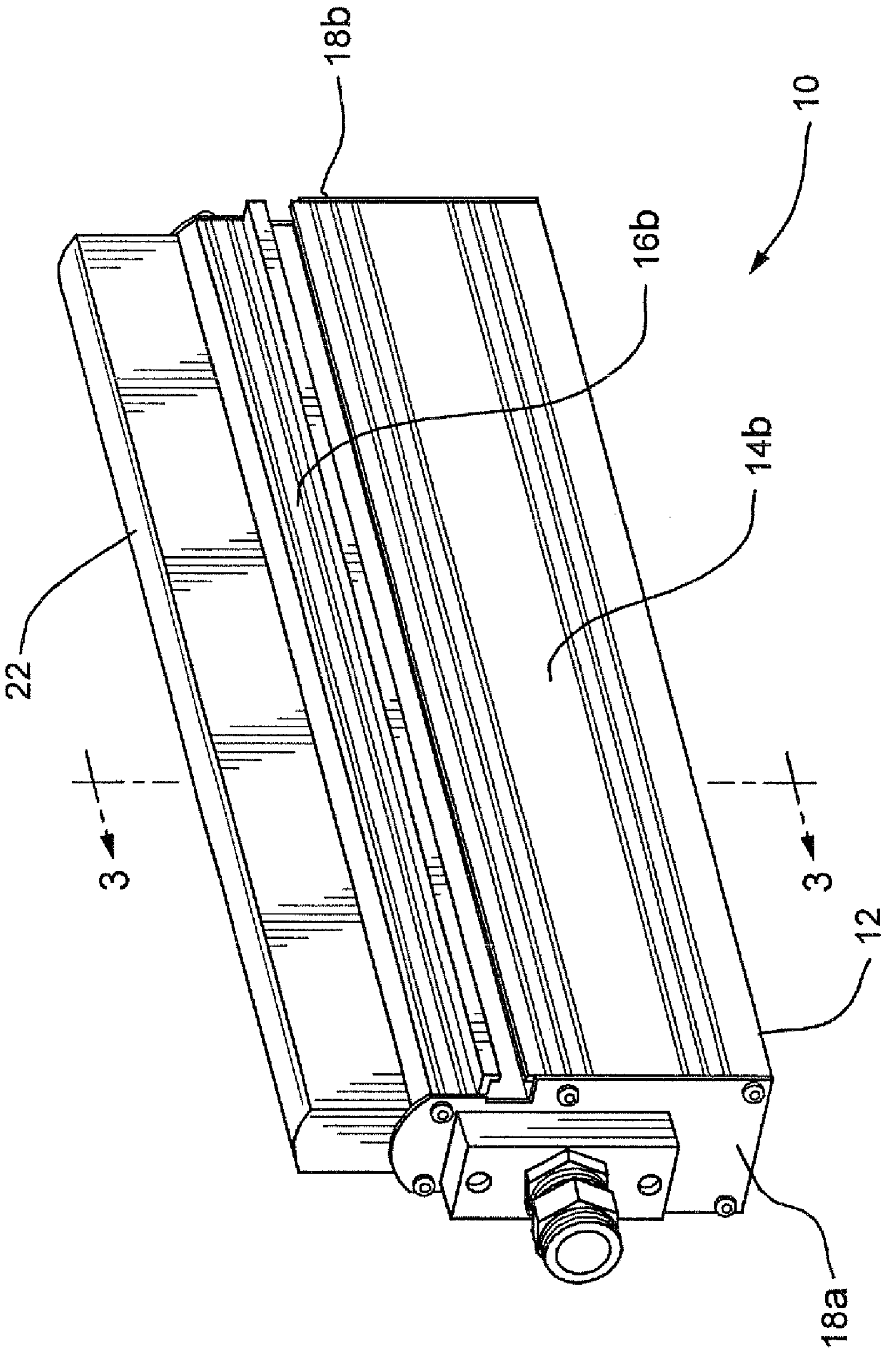
FIG. 1 is a perspective view of a high-intensity LED light source and integral cooling system embodied in accordance with the invention.
Figure 2:
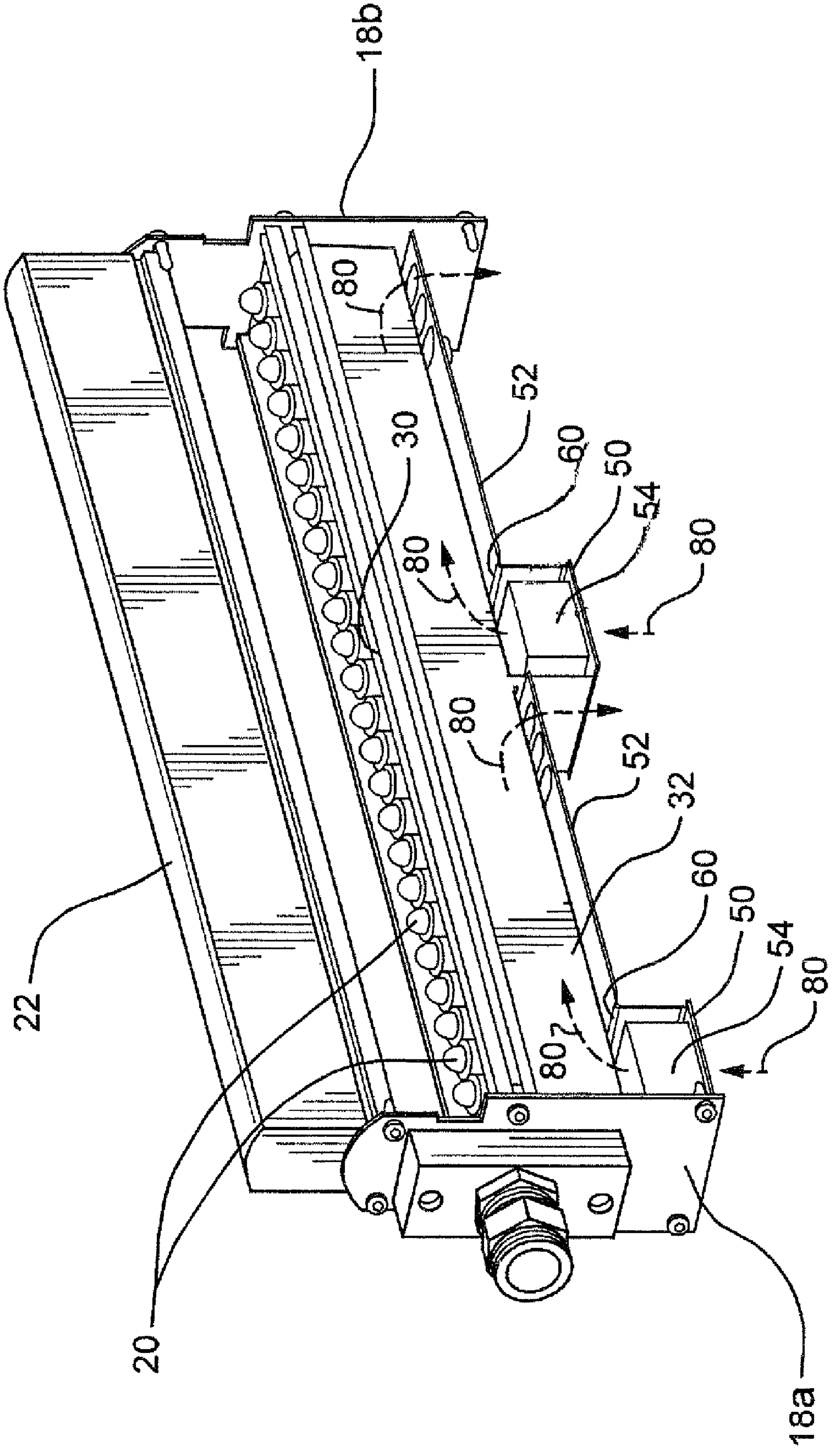
FIG. 2 is a perspective view of the light source and integral cooling system of FIG. 1 with a portion of the housing removed to show further details of the light source and cooling system components.
Figure 3:
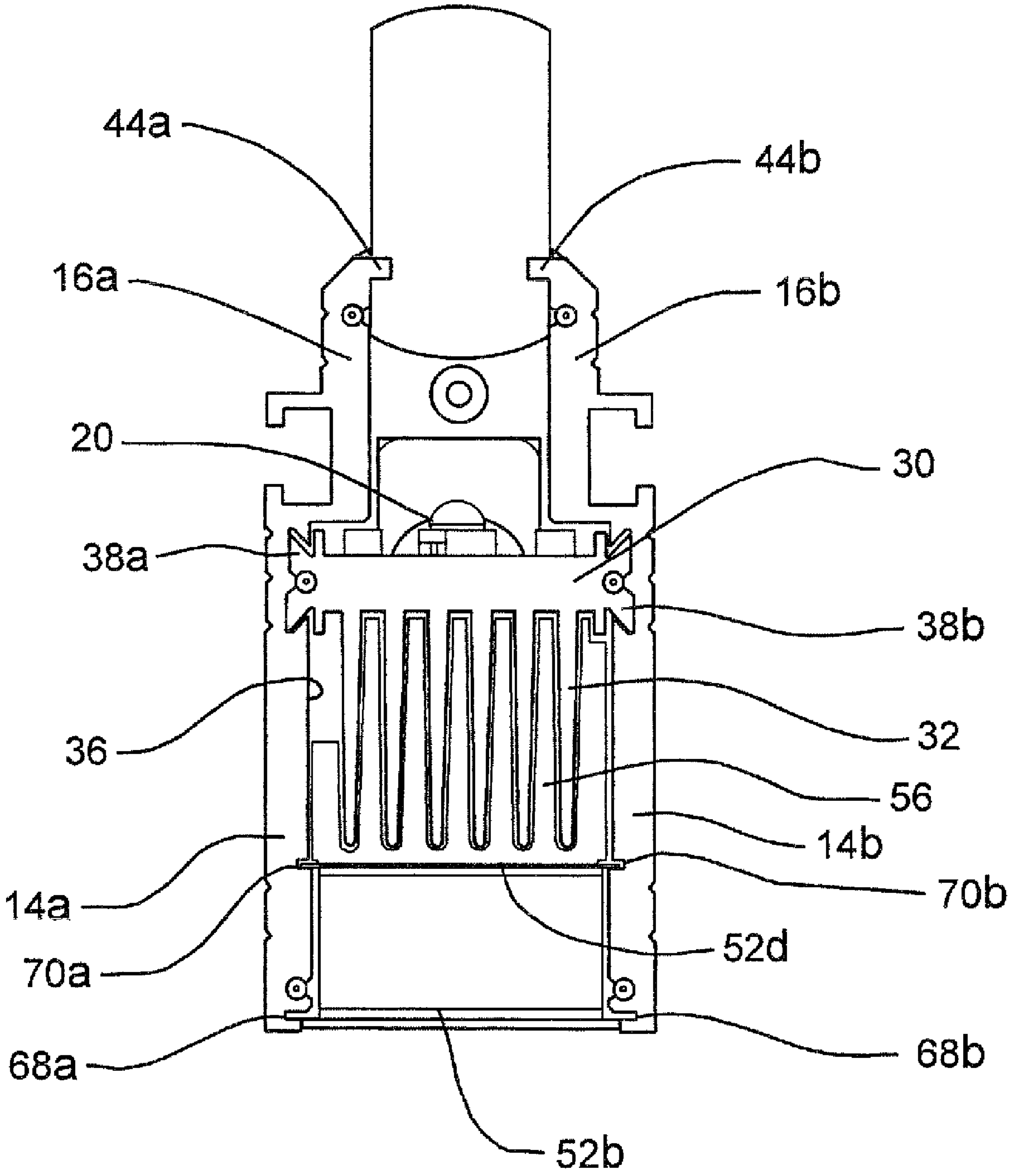
FIG. 3 is a cross-sectional view of the light source and integral cooling system of FIG. 1, taken along the line 3-3 shown in FIG. 1.

Referring now to FIGS. 1 to 3 of the drawings, there is shown a high intensity LED-based light source 10 embodied in accordance with the invention. The light source 10 is enclosed within a housing 12 that comprises side walls 14*a* and 14*b* which include upper side wall extensions 16*a* and 16*b*, respectively, and end caps 18*a* and 18*b*. An elongated optical lens 22 focuses light emitted from an array of high intensity LEDs mounted within the housing 12.

FIG. 2 shows the light source 10 of FIG. 1 with the side walls 14*a* and 14*b* and upper side wall extensions 16*a* and 16*b* removed to show further details of the components inside the housing 12. Specifically, the light source 10 includes a plurality of high intensity LEDs 20, such as those available commercially under the designation LUXEON, mounted in a linear array in thermal contact with a heat sink mounting block 30.

As best seen in FIG. 3, the heat sink mounting block 30, which is preferably extruded from a solid block of material with good thermal conductivity, such as aluminum, includes a plurality of integral cooling fins 32 extending downwardly in an internal chamber 36 defined by the side walls 14*a* and 14*b*, upper side wall extensions 16*a* and 16*b* and end caps 18*a* and 18*b* of the housing 12. The upper end of the heat sink mounting block 30 includes a pair of opposed dovetail extensions 38*a* and 38*b* which slidably engage in mating dovetail grooves formed in the inside surfaces of the side walls 14*a* and 14*b* to hold the heat sink block 30 in place in the housing 12. As is also evident in FIG. 3, the upper side wall extensions 16*a* and 16*b* include inwardly projecting lips 44*a* and 44*b* which slidably engage in mating grooves formed in the optical lens 22 to hold the lens 22 in place relative to the housing 12.

As shown in FIG. 2, the light source 10 includes a forced air cooling system comprised of a plurality of (e.g., two in the illustrated embodiment) individual cooling units 50 embodied in accordance with the invention. The cooling units 50 are mounted end-to-end within the lower part of the internal chamber 36 of the housing 12. Each of the cooling units 50 is identical in design and construction, with further details of the same being shown in FIG. 4 of the drawings.

Figure 4:
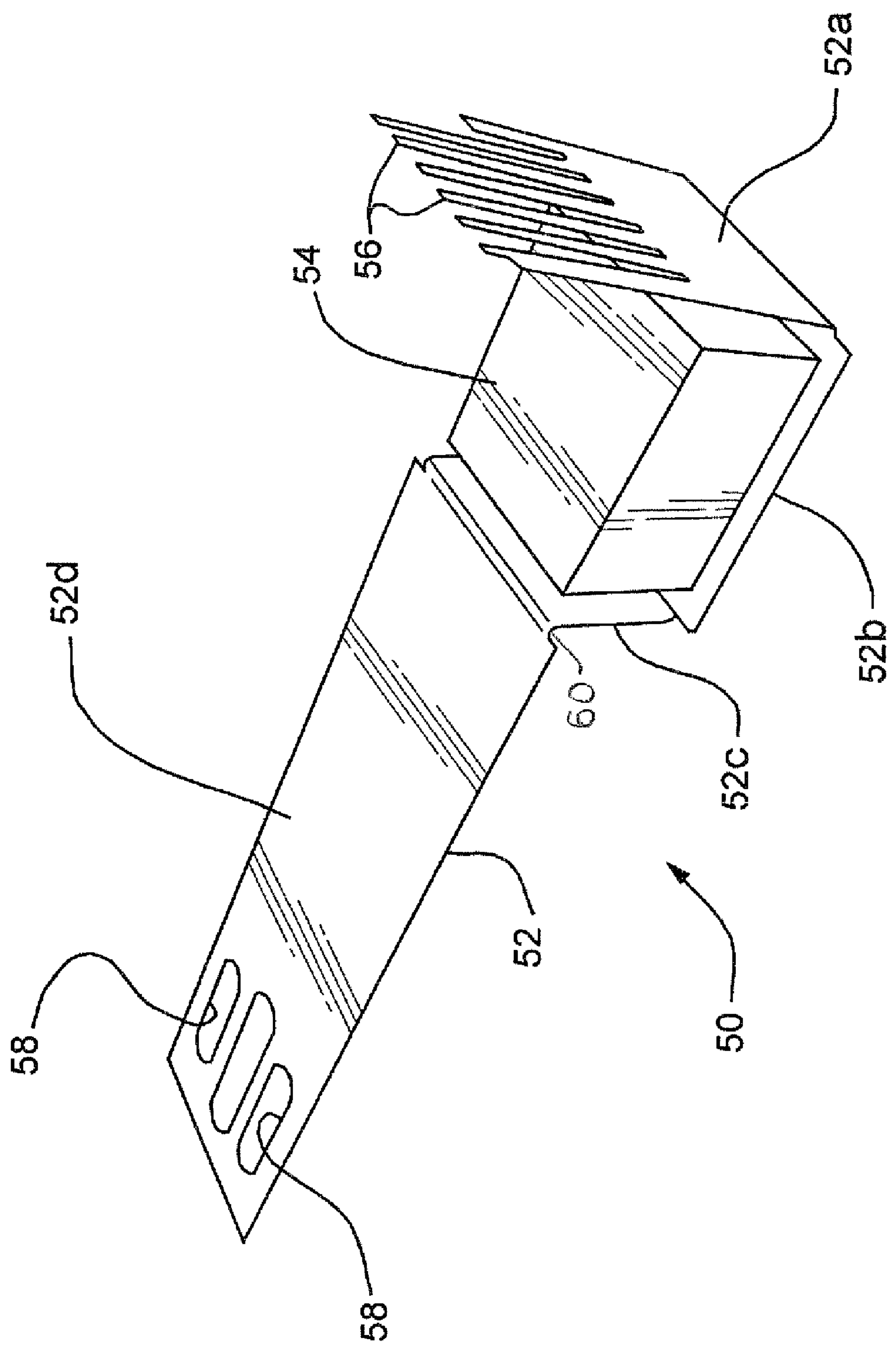
FIG. 4 is a perspective view of an individual modular cooling unit embodied in accordance with the invention.

Referring specifically to FIG. 4, each cooling unit 50 includes a base plate 52 on which is mounted a miniature cooling fan 54. The cooling fan 54 may be a DC-powered, axial cooling fan of the type used conventionally in printed circuit board based systems. The base plate 52, which is preferably fabricated from a single piece of sheet metal bent to the desired shape, includes a first generally vertical end portion 52*a* that extends upwardly from a first end of a relatively flat support portion 52*b* on which the cooling fan 54 is mounted. The first end portion 52*a* of the base plate 52 includes a plurality of upwardly extending fingers 56. The size, spacing and configuration of the fingers 56 correspond substantially to the spacings between the cooling fins 32 extending downwardly from the heat sink mounting block 30, as shown in the cross-sectional view of FIG. 3 of the drawings. As shown in FIGS. 3 and 4, one of the fingers 56 may be truncated so that, when the cooling unit 50 is mounted in the housing 12 of the light source 10, space is provided for wiring needed to power the cooling fans 54.

Referring again to FIG. 4, the cooling unit base plate 52 has a second generally vertical portion 52*c* that extends upwardly from a second end of the cooling fan support portion 52*b*. The base plate 52 also includes an elongated, generally horizontal portion 52*d* that extends horizontally from the upper end of the vertical portion 52*c*. The distal end of the elongated base plate portion 52*d* includes a plurality of (e.g., three) openings 58 which, as described in more detail below, serve as exhaust outlets for air flow through the cooling unit 50. A step 60 is provided at the junction of the second vertical portion 52*c* and horizontal portion 52*d* of the base plate 52. As also described in more detail below, this step 60 helps direct air flow from the cooling fan 54 in a generally horizontal direction along the horizontal base plate portion 52*d* of the base plate 52.

Figure 5:
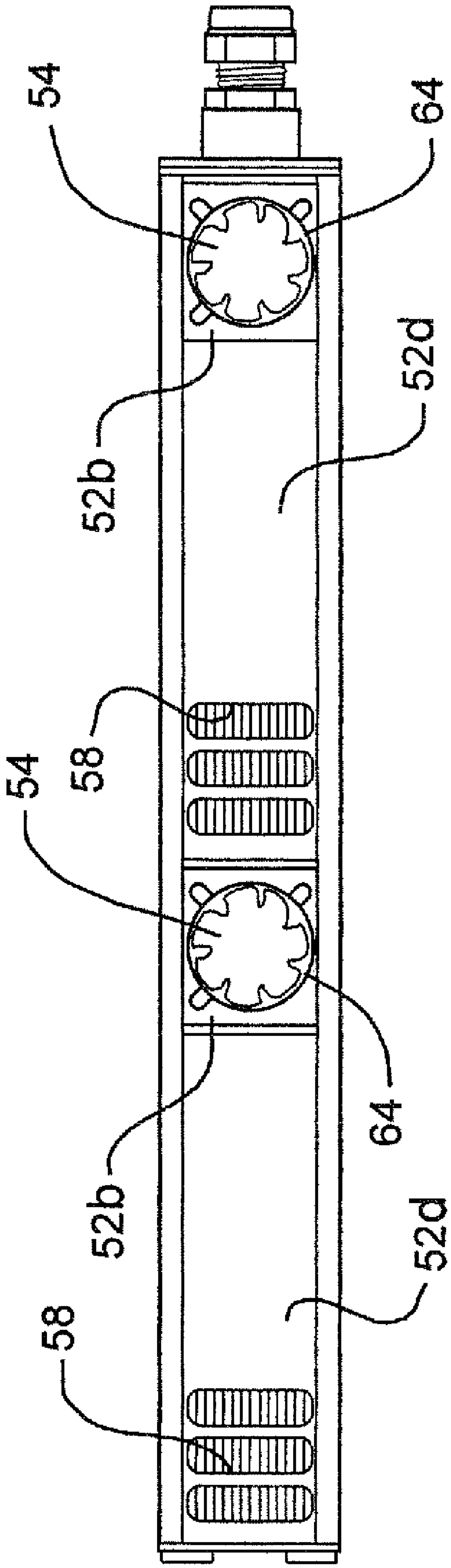
FIG. 5 is a bottom view of the light source and cooling system of FIG. 1.

As shown in FIG. 5 of the drawings, the cooling fan support portion 52*b* of the base plate 52 includes a central opening 64 that allows air to be drawn into the housing 12 by the cooling fan 54.

The cooling units 50 are mounted in the housing 12 of the light source 10 to provide a plurality of (e.g., two in illustrated embodiment) thermally isolated cooling chambers for the LEDs in the light source 10. As shown in FIG. 3 of the drawings, the cooling fan support portion 52*b* of the base plate 52 in each cooling unit 50 is adapted to slidably engage in a pair of grooves 68*a* and 68*b* formed in the inside surfaces of the side walls 14*a* and 14*b* of the housing 12. Similarly, the elongated horizontal portion 52*d* of the base plate 52 in each cooling unit 50 is adapted to slidably engage in a second pair of grooves 70*a* and 70*b* in the side walls 14*a* and 14*b*, spaced above the first pair of grooves 68*a* and 68*b*. This allows the cooling units 50 to be held firmly in place in the housing 12.

Referring again to FIG. 2 of the drawings, the air flow pattern through each of the cooling units 50 is shown generally by the arrows labeled 80 in the figure. More specifically, the cooling fan 54 draws air from outside the housing 12 through the opening 64 into the internal chamber 36 of the housing 12. The step 60 on the base plate 52 deflects the air flow and helps direct it in a direction generally parallel to the horizontal portion 52*d* of the base plate 52. The air drawn in by the cooling fan 54 thus flows by the cooling fins 32 on the heat sink mounting block 30, carrying heat generated by the LEDs 20 away from the cooling fins 32. When the air flow reaches the upstanding fingers 56 of the next adjacent cooling unit 50, the fingers 56 serve as baffles to direct the air flow downwardly and out of the internal chamber 36 through the exhaust openings 58.

It will be appreciated that any size and configuration of light source may be efficiently cooled according to the invention by stacking as many of the individual cooling units 50 as is required in the housing 12. In the case of a linear array of LEDs, as illustrated in the drawings, the cooling units 50 may be stacked end-to-end as needed depending on the length of the array. In the case of a two dimensional array of LEDs, the cooling units 50 may be stacked end-to-end and side-by side. The individual cooling units 50 are effectively thermally isolated from one another so that heat generated in one region of the light source 10 cooled by a first cooling unit 50 is not carried to another region of the light source 10 cooled by a second cooling unit 50.

It can thus be seen that the objects set forth above, among those made apparent from the preceding description of the illustrative embodiment, are efficiently attained. Since certain changes may be made in the construction set forth herein without departing from the scope of the invention, it is intended that all matter contained in the above description or shown in the accompanying drawings be interpreted as illustrative and not in a limiting sense.

What is claimed is:

1. A forced air cooling unit for a light source, said unit comprising a longitudinal housing having opposite side walls and a longitudinal centerline;

a heat sink suspended between said walls parallel to said centerline, said heat sink having a first face and a second, opposite, face, and a base suspended between said side walls opposite said second face so as to define therewith an internal chamber, said base including a plurality of similar sections positioned end to end parallel to said centerline, each section having a first portion extending substantially perpendicular to said second face and dividing the internal chamber length wise into separate compartments and a second portion extending substantially parallel to said second face, a cooling fan mounted to the second portion of each section proximate to the first portion thereof and a vent opening in the second portion of each section distal to the first portion thereof so that each fan circulates air only within the corresponding compartment.

2. The unit of claim 1 further including an array of light sources spaced along said first face.

3. The unit defined in claim 2 when the array of light sources comprises an array of light emitting diodes.

4. The unit of claim 2 further including a lens suspended between the side walls opposite the light source array.

5. The unit of claim 1 when the heat sink includes a plurality of cooling fins projecting from the second face into said internal chamber.

6. The unit of claim 5 wherein said first portion of said base includes a plurality of upstanding fingers interfitting with said fins.

7. The unit of claim 1 wherein the heat sink slidably fits in grooves in inside surfaces of said side walls.

8. The unit of claim 1 wherein the second portion of each base section includes a fan opening over which the associated fan is mounted and through which that fan draws air into the associated compartment of said internal chamber.

9. The unit of claim 1 wherein said second portion of the base includes a depression adjacent to the first portion thereof and said fan is mounted in said depression.

10. The unit of claim 9 wherein each base section further includes a step portion between said first and second portions that helps to direct the air circulated by the associated fan generally parallel to said second portion.

11. A forced air cooling system for a light source comprising a plurality of the units defined in claim 1 mounted side by side.

12. A combined light source/forced air cooling system comprising;

a housing having a longitudinal centerline;

a light source mounted in said housing;

a lens spaced opposite the light source;

a base plate mounted in said housing and defining with said housing an internal air flow chamber, said base plate including a plurality of similar sections positioned end to end parallel to said centerline, each section having a perpendicular portion extending substantially perpendicular to said centerline so as to divide said chamber lengthwise into separate compartments and a parallel portion extending substantially parallel to said centerline;

a cooling fan mounted on the parallel portion of each of said sections proximate to the perpendicular portion thereof which, when activated, draws air from outside the housing into the corresponding compartment of the internal chamber, and at least one opening in the parallel portion of each base plate section distal to the perpendicular portion thereof through which air flows to or from the corresponding compartment of the internal chamber.

13. The system defined in claim 12 further including a heat sink mounted in said housing between said lens and said base plate.

14. The system of claim 13 wherein the light source is an array of light emitting diodes mounted to said heat sink opposite said lens and extending parallel to said centerline.

15. The system of claim 14 where said housing has opposite walls and said lens, said base plate and said heat sink slidably interfit with grooves in said side walls.

* * * * *